May 18, 1948.    J. M. S. KAUFMAN ET AL    2,441,636
SUN COMPASS
Filed July 6, 1943    3 Sheets-Sheet 1

Inventors
Joseph M. S. Kaufman
Shelley Krasnow
Attorney

May 18, 1948.　　　J. M. S. KAUFMAN ET AL　　　2,441,636
SUN COMPASS
Filed July 6, 1943　　　3 Sheets-Sheet 2
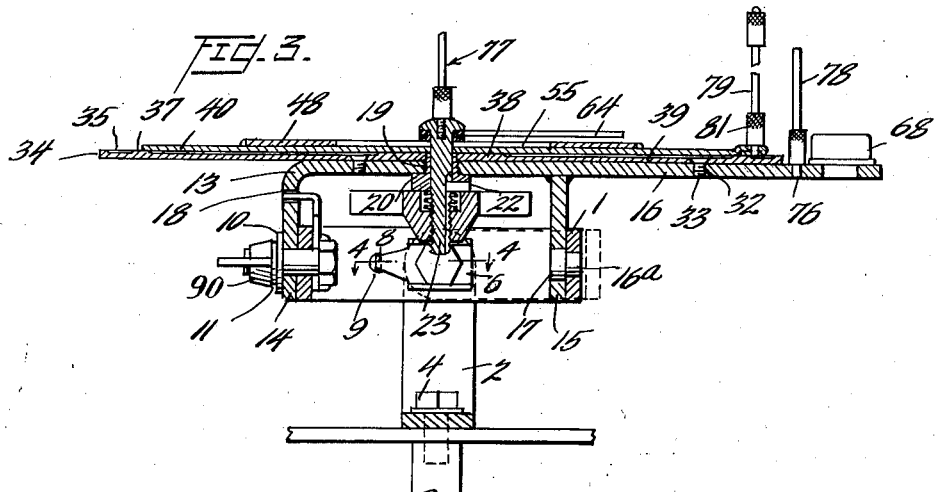
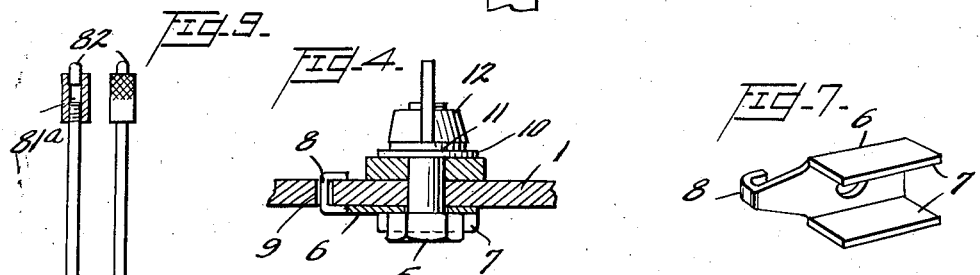
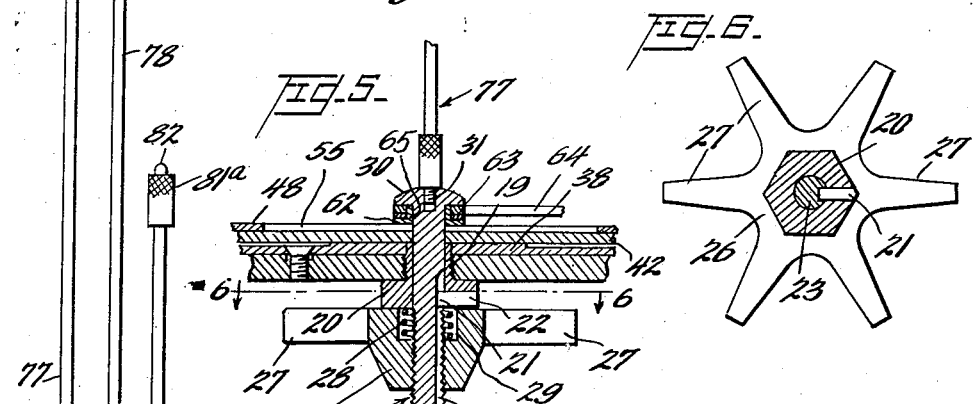
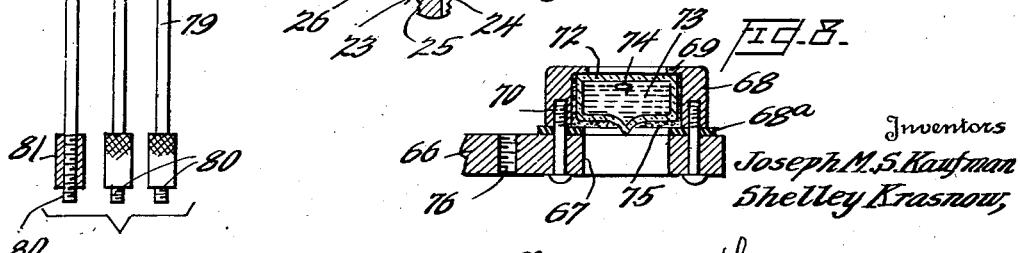
Inventors
Joseph M. S. Kaufman
Shelley Krasnow,
By
Shelley Krasnow
Attorney May 18, 1948.    J. M. S. KAUFMAN ET AL    2,441,636
SUN COMPASS
Filed July 6, 1943    3 Sheets-Sheet 3
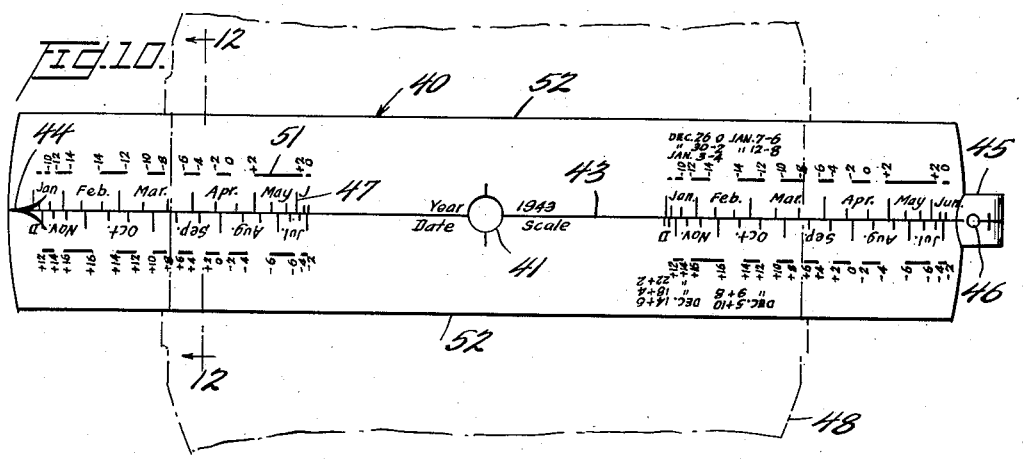
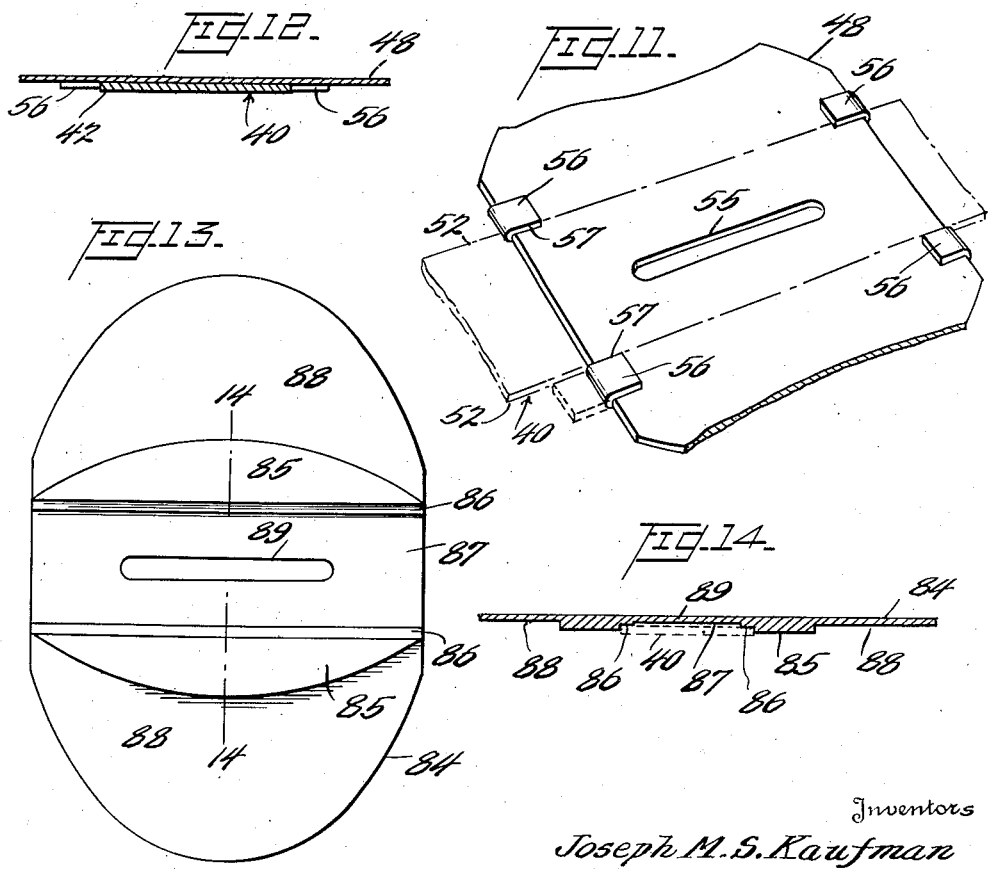
Inventors
Joseph M. S. Kaufman
Shelley Krasnow,
By
Shelley Krasnow
Attorney Patented May 18, 1948

2,441,636

UNITED STATES PATENT OFFICE 2,441,636

SUN COMPASS

Joseph M. S. Kaufman, Washington, D. C., and Shelley Krasnow, Arlington, Va.

Application July 6, 1943, Serial No. 493,674

5 Claims. (Cl. 33—1)

This invention relates to navigational and directing instruments, for indicating a course or path by means of a shadow cast upon an appropriate member. In the particular example shown herein, there is described a compass suitable for navigating and directing vehicles, making use of the sun's shadow.

It is an object of the invention to provide an improved instrument by which, without the use of any intricate or delicate clockwork mechanism, it is possible to navigate with a high degree of precision.

It is a further object of the invention to provide a navigating instrument for directing the course of a vehicle or craft, without having such instrument affected by violent changes in motion of the craft or vehicle.

It is a further object of the invention to provide an apparatus which can be used in north or south latitudes with equal facility, and which can be used with either the sun's shadow, or a star.

It is a further object of the invention to provide a sun compass with a leveling means, the leveling means being particularly adapted to resist the heat of the sun, and to be readily visible.

It is a further object of the invention to provide a relatively sturdy apparatus which may be assembled and disassembled, or repaired, in the field with facility and will be particularly adapted to processes of quantity manufacture.

Reference is had to the accompanying drawings, in which:

Figure 3 shows a vertical cross-sectional view of the complete sun compass, taken across the plane 3—3 of Figure 1.

Figure 4 shows a cross-sectional enlarged view of the nut, bolt and bolt lock assembly across the plane 4—4, in Figure 2.

Figure 5 shows an enlarged cross-sectional view of the upper portion of the assembled unit shown in Figure 3.

Figure 6 shows a cross-sectional view of the bushing shown in Figure 5, and indicates the detail of the key and keyway.

Figure 7 shows an enlarged view of the bolt lock shown in Figure 4.

Figure 8 shows an enlarged cross-sectional view taken across the vertical plane, of the level vial and housing shown in Figure 3.

Figure 9 shows the three sighting rods utilized with the apparatus, one of the rods being indicated in vertical cross section.

Figure 10 shows the plan view of the date bar, giving the various indicia marked upon the said bar.

Figure 11 shows a detail of the underside of the solar plate, indicating the manner of guiding the same.

Figure 12 shows a cross-sectional view of the date bar and solar plate indicated in Figure 10, taken across the plane 12—12.

Figure 13 shows an alternative method of fabricating the solar plate, indicating particularly the underside of the said plate.

Figure 14 shows a vertical cross-sectional view of the solar plate shown in Figure 13, taken across the plane 14—14.

Figure 1:
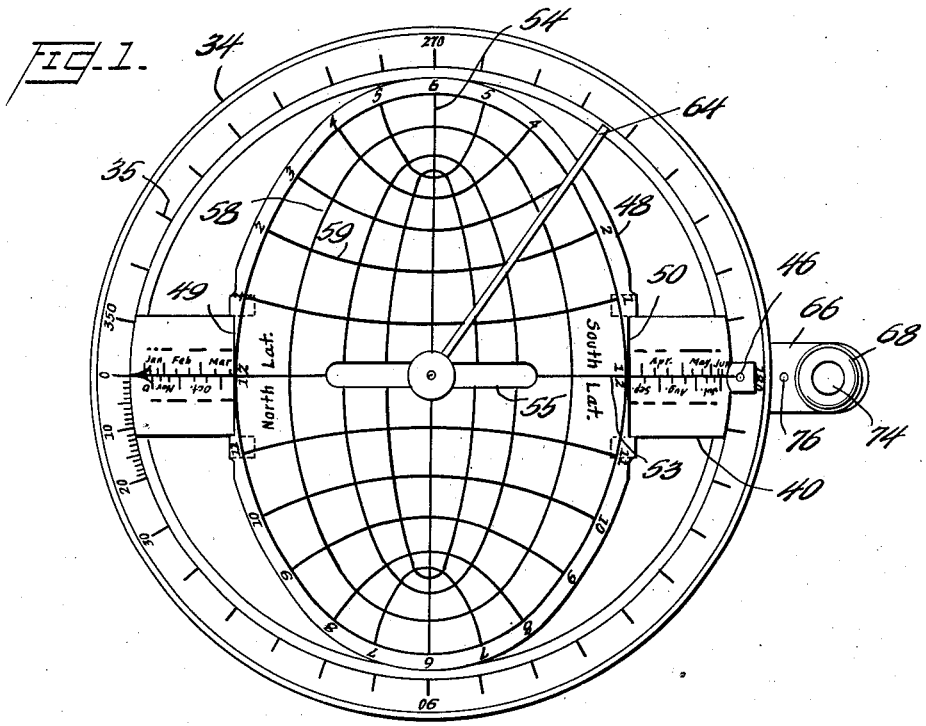
Figure 1 shows a top view of the assembled sun compass, ready for use.
Figure 2:
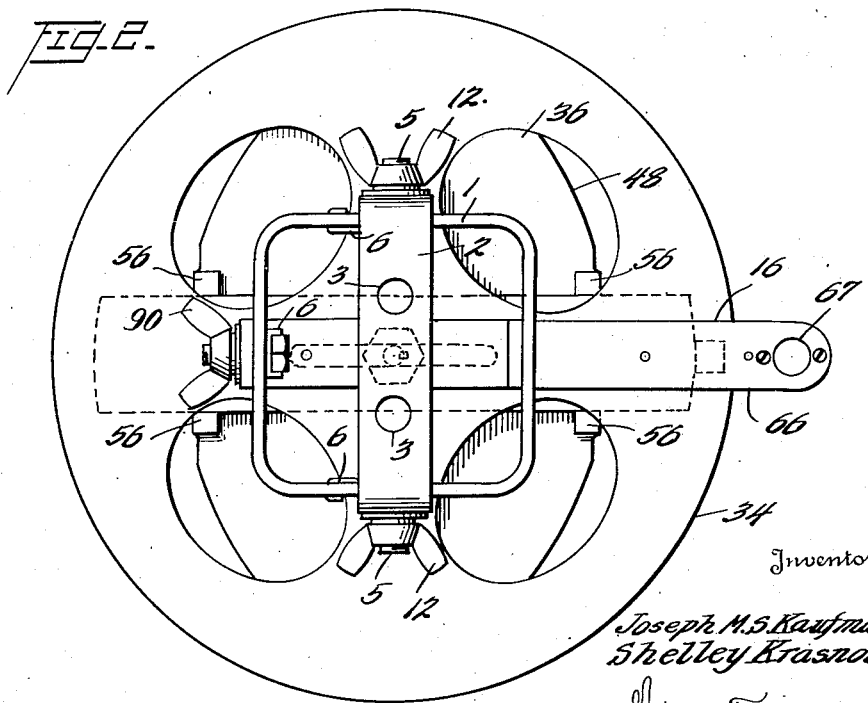
Figure 2 shows a view of the underside of the completely assembled sun compass, removed from its mounting on the craft or vehicle.

The sun compass is carried on a square metal frame 1, to which is affixed in adjustably rotatable relation, a frame 2. Frame 2 is preferably provided with two drilled holes 3, near the center thereof, for attachment to a support by means of bolts 4, 4. Other means of attachment, such as clamping, welding, riveting, or any of the other commonly used mechanical means of fastening may be utilized. The terminal portions of frame 2, are provided with drilled holes, through which are placed bolts 5, 5. The head of bolt 5, passes through a bolt lock 6, which is provided with two upturned flanges 7, to prevent the head of the bolt from rotating when adjustment is made. These locks are maintained in the frame 1, by having the tongue 8, project through a drilled hole 9, in the frame 1, after which the tongue is bent over to secure locking thereof. The bolts are each provided with a metal washer 10, a lock washer 11, and a wing nut 12. By loosening wing nut 12, it becomes possible to adjust the frame 1 relative to the frame 2, so as to secure a desired change in the position of the frame 1. At right angles to the frame 2, a frame 13 is mounted in rotatable relationship, somewhat similar to the relationship of frame 2 to frame 1. Frame 13 contains two downwardly depending portions 14 and 15, the portion 14 preferably being formed by bending, and the portion 15 by the affixing of a separate piece of metal by means of welding or otherwise. An elongated portion 16 projects from the frame 14, the purpose of which will be hereinafter fully described. A pin 16a is affixed permanently in frame 1 by welding, riveting, or otherwise, and is fixed so as to be in freely rotatable relationship with a hole 17 in member 15. At the terminal portion of member 14, there is a clamping arrangement similar to that described in connection with frame 2. It will be noted that a nut lock 6, is also provided, and that this is fastened into an opening 18, of member 14. Thus, by loosening wing nut 90, it becomes possible to adjust the frame 13 relative to frame 1. It will be noted that frame 2 is made of such proportions, that it can be folded over to lie parallel to frame 1. Since pin 16a is finished flush with the surface of frame 1, this folding can be accomplished. The purpose of the folding is to allow for compactness in storing and carrying the apparatus.

Frame 13 is provided with a threaded hole 19, into which is screwed the bushing 20, having an outer threaded portion, engaging the threaded portion 19 above described. A key 21, is fastened into slot 22, made in bushing 20, by soldering or otherwise. Passing through the center of bushing 20 is a bolt 23, having a slot or keyway 24, which engages with the key 21 in bushing 20.

The lower portion of bolt 23, is provided with a threaded portion 25, which engages with a nut 26, provided with laterally extending wings 27. A spring 28 is placed in a recess 29, in the nut 26, and serves to maintain a slight tension on the bolt, even when the nut 26 has been loosened. The upper portion of the bolt 23 is provided with a shouldered part 30, and with a centrally located threaded hole 31, the purpose of which will be hereinafter more fully described.

The frame 13 is provided with two threaded holes 32, into which pass screws 33, serving to hold a protractor plate 34. This plate is preferably circular in form, and preferably provided with graduations 35 in degrees near the periphery thereof. Holes 36 are provided to lighten the protractor without any substantial sacrifice of rigidity.

The protractor may be made of plastic, or preferably of metal, such as brass, aluminum, stainless steel, or steel. The numerals graduations 35 or other indicia are preferably provided on the said protractor plate by etching, and a reverse etch is preferably used, namely one in which the figures and graduations remain, and the background is etched away to a substantial depth. A raised portion 37, near the periphery, and a centrally raised hub portion 38, are provided. If the unit is made by the etching process described above, the raised portions 37 and 38 can be provided at the same time the numerals and graduations 35 are etched. In other words, portions 37 and 38 would remain the same height as the graduations 35 on the periphery, the portion 39, intermediate the hub portion and the periphery being etched away at the same time as the background of the numerals and graduations. If the protractor 34 is made of a corrodable material, it is preferably provided with a corrosion resistant coating such as nickel or chromium plating. In such event, it is preferable to use a dull plating and a black background. Immediately above the protractor plate 34, is a date bar 40, best shown in Figure 10, with a central hole 41, pivoting on bolt 23. The date bar has an under flat surface 42, which bears upon the raised portions 37 and 38 upon the protractor plate, when the date bar is rotated. In the center of the date bar is a line 43 which extends longitudinally from one end to the other provided with an arrow 44, which is intended to read against the graduations 35 on the protractor plate. At the rearmost portion of the date bar 40, is a lug 45, which is made double the thickness of the metal of the date bar by folding over as shown, and is further provided with a threaded hole 46, the purpose of which will be hereinafter more fully described. Upon the surface of the date bar, and extending from the center line are a number of graduations 47, perpendicular to the center line 43, the said lines 47, serving to indicate the correct position for the solar plate 48, depending upon the season of the year. The graduations 47 are preferably provided for every ten days of each month. In order to facilitate the reading of the position of the solar plate 48 upon the date bar, the scales 47 are reproduced in duplicate at either end of the date bar and may thus be read against index 49, or the index 50 of the solar plate 48.

In addition to the graduations 47, above described, an additional set of short lines 51 are provided with numerals. These indicate the equation of time, indicating the corrections to be applied to the reading of time for the different months of the year. The edges 52 of the date bar are machined parallel to the center line 43, thereof, and are also machined so as to be parallel to each other. It is to be noted, that because of the shifting of the plane of the ecliptic, the calculations for the position of the lines on the date bar, are made for a given year, and are valid for that year only. However, the difference or error due to using a date bar calculated for one year in a succeeding year will be rather small. If precise results are desired, separate date bars, mechanically interchangeable, can be provided, and can be changed with each change of a year. Alternatively, where less precision can be tolerated, a date bar can be calculated so as to represent the average for a period of ten years, and may be used for this period.

It will be noted that if a set of bars is provided covering years which have passed, when they are placed upon the instrument, they will enable one to determine what the direction of the shadow would have been for any given time in the past. Thus, the instrument becomes useful if it is desired to determine where a given shadow had fallen, or should have fallen at such time in the past. Such data are often of importance in matters involving legal testimony.

Similarly, interchangeable solar plates can be provided to interchange mechanically with the others, but marked with indicia enabling reading either greater or lesser latitudes. It is to be pointed out, that it is preferable to have the instrument provided with a solar plate reading for no latitudes higher than the highest that will be encountered. Obviously, the more lines that appear on the solar plate, the more possibility there is of confusion. Thus, though it is possible to provide plates for the full 90 degrees, these will in general have far more lines than are necessary for general use, which lines will tend to confuse the user. Thus, a set of interchangeable plates can be provided so that only those latitudes which are of interest will be provided.

As an alternative, where the instrument will be used chiefly in high latitudes, or only in high latitudes, the central portion of the solar plate may be left blank, the outer lines still remaining. This will facilitate the reading of the instrument, particularly under the stress of adverse weather conditions.

Since navigation is generally conducted in a given latitude for a considerable length of time, only part of the solar plate will be of interest. Similarly, graduations of different types may be placed on both sides of the solar plate, and locating lugs about it on both sides, so that the plate may be reversed and one set of graduations or the other utilized, the lugs being so located that the solar plate will move accurately along the intended part of the date bar.

Upon the date bar 40, rests a solar plate 48. This is generally elliptical in form, and is mounted with its longer axis at right angles to the date bar. The solar plate is provided with two lines 53 and 54, at right angles to each other, representing the two principal axes of the plate. In the central portion of axis 53, there is an elongated slot 55, permitting the solar plate to be moved transversely, relative to bolt 23. Placed symmetrically on either side of the axis 53, are four separated tabs, 56. If the solar plate is produced by stamping, these tabs are preferably stamped at the same time as the remainder of the plate. They are then folded underneath as shown in the drawing, and the position of the edges 57 of lugs 56 adjusted so that when the solar plate is laid upon the date bar 40, the surfaces of 57 will engage with the surfaces 52, 52, of the date bar. If the tabs 56 are properly located, and properly adjusted, they will allow longitudinal adjustment of the solar plate relative to the date bar without any rotational motion.

The solar plate 48 is provided with indicia on its upper surface. These consist of a series of concentric ellipses 58, representing latitude. In the specific example shown, the plate has been provided with graduations up to 45 degrees north and south latitude, although these graduations have not specifically been designated as such on the drawing. A plate can be provided for any desired value of latitude up to 90 degrees. At 90 degrees, the ellipse will become a circle, and the outer contour will be a circle. In order to facilitate the reading of the lines constituting the solar plate, it is desirable that every other line be made wider than the others. To aid this process further, each fourth line can be made extra wide, so that the eye will easily locate the desired point. This is particularly necessary to avoid the confusion to the eye caused by the network of intersecting ellipses and hyperbolas. Dull chromium plating has been found suitable for the surface of the solar plate, and for the complete date bar. The plate is preferably made symmetrical about the axes 53 and 54, in which case the portion of the line nearest the index 44, on the date bar 40, will be for north latitudes, and the portion lying on the other side of the solar plate will be for south latitudes. A series of hyperbolas 59, are provided, intersecting the ellipses as shown. These represent hours. In the special case of 6:00 o'clock, the hyperbola degenerates into a straight line, constituting the longer axis 54, of the ellipse. In the case of 12:00 o'clock, the hyperbola also degenerates into a straight line lying along the short axis of the ellipse. At the terminal portion of the 12:00 o'clock position of the ellipse, are two surfaces 49 and 50, machined so as to lie accurately at right angles to the short axis of the ellipse, and adjusted so that the difference apart between the surfaces 49 and 50 is equal to the distance of separation of the scales on the date bar.

Above the solar plate 48 is a bushing 62 which fits on the bolt 23, and has lying above it flat spring 63. Above the flat spring is a pointer 64, which fits under the head 30 of bolt 23, and about a portion 65 of the bushing 62. The pointer is thus swiveled so as to move around the center of the bolt 23. A portion 66 of the frame 13 projects beyond the protractor plate 34, and is provided with a large bored hole 67. Affixed to the portion 66 of the frame 13 is a casing 68, made with an upper shoulder 69, and provided with two drilled threaded holes 70, 70. The exterior surface of the casing 68, is provided with a brightly polished chromium plating to reflect the rays of the sun, and prevent the transmission of undue heat to the interior of the member. Beneath the member 68, is a heat-insulating washer 68a, preferably made of plastic, or other heat insulating material, adapted to restrict the flow of heat from the frame 13 to the casing 68. The underside of the rim of flange 69, of the casing 68, is blackened, for a purpose hereinafter more fully described. Within the casing 68, is a preferably transparent level vial 72, containing liquid 73 and a bubble 74. The outer wall of the level vial is preferably made of Pyrex glass, to insure strength and minimum expansion with changes in temperature. When the bubble 74 is viewed from above, due to the provision of the blackened rim on the underside of flange 69, of casing 68, the bubble 74 will appear to have a black ring surrounding it. This is due to the walls of the bubble acting as a curved mirror and reflecting an image of the black underside of the casing. The bubble will thus become easily visible, even though a white background and colorless liquid is provided. It is pointed out, however, that a liquid of any color may be utilized. If so, the color of the underside of the flange should preferably be complementary to that of the color of the transparent liquid. Thus, if the liquid is red, the underside of the flange may be made green or may be made black. The lever vial 72, is fastened by means of cement or plaster 75 in the casing 68, and thus will constitute a separable member which may be easily replaced in the field. It is understood that when the level vial 72 is placed in the casing 68, it is leveled, so that when the underside of the casing 68 is on a level surface, the bubble will be in the center of the level vial.

A threaded hole 76 is provided in the portion 66 of frame 13, and serves to hold a rod, the purpose of which will be hereinafter described. Rods 77 and 78 are provided, one of these rods fitting into the threaded hole 31 in the center bolt 23, another in the threaded hole 46 of date bar 40. The rods are preferably made of steel, and are provided with threaded portions 80 at their terminal portion. A narrow sleeve 81, threaded internally, is driven tightly onto each of the rods above named, and preferably affixed with solder. This will provide convenient means for placing and removing the threaded rods from their corresponding threaded holes. At the upper portion of each of the rods there is a threaded ferrule 81a which screws upon the thread at the upper end of the rod. In this is a small glass capsule 82, containing radioactive luminous material. The purpose of this will be hereinafter described. It is understood that instead of providing a self-luminous portion at the upper end of the rod, a small electric light bulb may be provided, and the rod made hollow to allow the passage of small wires down to a battery maintained in the lower part of the unit.

Figure 13 shows an alternative method of making the solar plate. Here, a flat piece 84, preferably of metal, has a plane upper surface upon which the indicia are marked or engraved. The underside is provided with two arcuate shaped pieces, 85, 85, the inward edges of which define vertically extending portions serving to locate the solar plate upon the date bar 40. Intermediate between the vertical shoulders formed by the pieces 85, 85 is a shallow groove 87. This provides ridges 86, 86, which are below the level of portion 87, when the latter is in operating position. The portions 85, 85 serve to thicken the plate 84. They also serve to provide vertical portions constituting locating shoulders, so that the solar plate will move along a truly straight line on the date bar. The portion 87, prevents scraping of the underside of the piece 84 on the date bar 40, thereby avoiding the marring of the indicia upon the date bar. The portions 88, 88 are thinned to reduce the weight of the solar plate. A slot 89 is provided as before, extending completely through the material of the plate, similar to slot 55 in solar plate 48.

The mode of operation of the apparatus is as follows: The wing nuts 12 and 90 are loosened, upon which the frame 13 and the indicating members placed thereabove may be rotated about two horizontal axes at right angles to each other, in order to level the entire assemblage. When the bubble in the level vial 12 is in the center of flange 69, this indicates that the frame 13 and the members placed thereabove are level, and the wing nuts 12 may be tightened. The nut 26 is then loosened, and the date bar 40 then rotated so that its index mark 44 points to the graduation 35 upon the protractor plate 34, corresponding to the direction in which it is desired to travel. The solar plate is then moved longitudinally along the date bar, until the edge thereof corresponds to the date of the year. The pointer 64 is then rotated about the center until it lies over the intersection of the ellipse representing the latitude, and the hyperbola representing time. The longer of the shadow rods is inserted in the threaded hole 31, and the sun's shadow allowed to fall on the solar plate 48. The nut 26 is then tightened, which operation will simultaneously clamp pointer 64, solar plate 48 and the date bar 40. The instrument is now ready for use. All that is necessary is to steer the vehicle or craft on which the instrument is mounted in such fashion that the sun's shadow will fall directly over the pointer 64. When this condition is attained, the vehicle or craft will be traveling in the intended direction. It should be noted that since the time is constantly changing, it will be necessary to alter the lateral position of the pointer 64 occasionally. It is advisable to make this alteration approximately every 15 minutes.

In referring to the time above, what is meant is the local sun time. This is obtained as follows: The meridian upon which the local standard time is based is determined. If the local meridian in which the instrument is being utilized is east of the time meridian, four minutes are added for each degree of longitude that the local meridian departs from the standard time meridian. If the meridian is west of the standard time meridian, four minutes are subtracted for each degree of longitude. A further correction is made utilizing the figures engraved upon the date bar and placed beside the graduations in the center of the date bar. These represent the equation of time and indicate in minutes the correction to be applied. These figures are preceded with either a plus or minus mark, indicating whether the additional correction is to be added or subtracted from the figure previously obtained. It is understood that if daylight saving time or war time is utilized in connection with the time-piece, a further correction of an hour will have to be applied to the time-piece to bring it to the standard local time.

During certain periods of the year, through the months of December and January, the additional correction to be applied changes rather rapidly, and it is not convenient to show this graphically upon the date bar. For this reason, additional figures are provided giving the dates in December and January and the corresponding corrections.

The instrument may be used on a vehicle which is in motion, even if it is subjected to rather violent turns and accelerations. Because it has no rapidly moving parts, the instrument will not be affected by such violent movement. It can be read whenever the vehicle is approximately level, as indicated by the bubble in the level vial 12.

An alternative method of using the instrument is to hold the vehicle or craft stationary, adjust the various parts of the compass as indicated above, and utilizing the additional rod inserted in threaded hole 76 on the frame, sight on a distant object when the vehicle is so turned that the sun's shadow falls directly on pointer 64. The vehicle can then be steered for the distant object sighted upon, without further reference to the sun compass. Upon reaching this point, the vehicle can be stopped, the compass sighted again, and a new object selected as the reference mark.

The sun compass may also be used to determine the azimuth of an unknown course or unknown object. To perform this operation, the position of the solar plate is adjusted relative to the date bar as described above. The two rods 77 and 78, are then sighted on the distant object, the date bar is then rotated, together with the solar plate, until the shadow of the central shadow rod falls across the intersection representing the latitude and time. The pointer 44 of the date bar 40, will then point to the figure on the protractor representing the bearing of the distant object.

The apparatus may be used at night, sighting on a star, preferably on Polaris. For this reason, a short rod is used in position 46, on the date bar, to allow one to sight upward at a steep angle. When the rods in position 31 and 46 are in line with Polaris, the pointer on the date bar will be pointing north. The actual bearing of the vehicle or craft can then be read on the protractor plate.

Alternatively, a given course may be steered by setting the date bar to the desired azimuth on the protractor plate, and steering the craft or vehicle, so that the two vertical rods and Polaris will be aligned at all times.

It will be noted that the portion of the solar plate nearest the pointer on the date bar is marked for north latitudes and the portion on the opposite side for south latitudes. The uses of the respective portions will be evident from this.

While metal has been described above as preferable constructional material for the various components of the apparatus, wood, plastic, cardboard, or heavy paper may be substituted. The various graduations and indicia may be applied by printing, engraving, embossing, or lithographing. It may also be produced photographically upon the various elements.

A dimension of about 8½ inches for the diameter of the outer protractor plate has been found convenient for the navigation of land vehicles. However, particularly where the unit is to be used intermittently or at odd times, or is intended for emergency use only, such as in the case of life boats, it may be made somewhat smaller in diameter. If the dimension of the outer dial is reduced to approximately 3 or 4 inches, the entire unit can be made small enough to fit into a small protecting cloth or leather case, and carried in the pocket. Such a unit is particularly appropriate for use in life boats, since it will withstand rough mechanical handling, has no delicate moving parts, and will work even after it has been immersed in water.

It will be noted, that the pointer 64 may be dispensed with, although the use of this pointer saves a great deal of fatigue in attempting to line up the shadow produced by the vertical rod 77, upon the appropriate intersection of the lines on the plate.

While the specific use of the sun and of the star Polaris have been mentioned in connection with the apparatus, it will be evident that it may be applied equally well to other celestial bodies, which are capable of casting a shadow either directly or indirectly, or of being sighted upon. The principles may also be utilized where an artificial light is utilized, and it is desired to orient or to guide a member by means of the shadows thereof.

The apparatus herein described may also be utilized as a sun clock, for if set accurately to the actual azimuth at the location, and the solar plate is set upon the date bar to the appropriate season of the year, the shadow cast by the shadow rod will fall upon the intersection of the latitude of the particular locality and the time. It will be noted that to convert this time to actual standard time, it will be necessary to reverse the procedure named above. In other words, the correction indicated graphically on the date bar will have to be applied with the opposite sign to that indicated, and four minutes subtracted for each degree of longitude east of the time meridian or added for each degree west of the time meridian. The results of these operations will then give the local standard time.

It will be noted that the apparatus may be made self-leveling, by providing freely moving bearings at all of the joints of the gimbal frame, and having a weight at the lower portion of the nut 26. This will avoid the necessity of leveling the unit whenever a reading is taken, and will make unnecessary the level vial indicated.

We claim:

1. In an apparatus of the class described, a protractor plate, swiveling means in the said protractor plate, a rotating member adapted to lie upon the protractor plate and to rotate about the said swiveling means, the said rotatable member having a substantially plane lower surface bearing upon the said protractor plate, the said protractor plate being provided with reversed etched portions, whereby the indicia thereon will be raised relative to the background, a rim upon the said protractor plate and a center hub portion on the protractor plate being both of the same height as the indicia, with the material therebetween removed by etching, whereby the said rotatable member will bear at the hub portion and outer portion of the protractor plate respectively without frictional interference with the remainder of the said plate.

2. In a component for an instrument in which indicia are provided upon a surface and a movable member moves over and bears upon contiguous portions of the surface, raised portions constituting bearing surfaces for the said movable member, the material between the said bearing portions being relieved so as to prevent interference with the said movable member, indicia formed with a surface at the same height as the said bearing surfaces and demarcated by having the contours of the said indicia relieved to the same extent as the material between the bearing surfaces, whereby the simultaneous production of the bearing surfaces, relieved portions and indicia is facilitated.

3. In a component for an instrument, a member of flattened form having indicia thereon and an element pivoted to move upon the said member and be guided by a surface thereof, the said member having the surfaces comprising the indicia and plural bearing portions all at the same height, the element moving over and bearing upon the plural bearing surfaces, the space between the bearing surfaces being relieved to the same extent as the background of the indicia.

4. In a component for an instrument, a dial member of flattened form having a central hub portion and an outer circumferential portion, an element resting upon and rotating about the central hub portion and bearing against the outer bearing portion, the central hub portion and the outer bearing portion being of the same height with material therebetween removed so as to provide relief for the moving surface of the element, indicia upon the outer portion of the said flattened member, the said indicia having the characters thereof of the same height as the said bearing portion, with the background for the said indicia relieved to the same extent as the relieved portions between the bearing surfaces.

5. In an instrument component, a circular dial member having bearing surfaces over which a flattened member is guided and an outer dial portion having indicia thereon, the said dial member being circular in form, having a circular hub in the center thereof and a circular raised rim at the circumferential portion thereof, a flattened member resting upon and guided by the said central hub member and the outer circumferential portion, the outer circumferential portion having additionally indicia of the same height as the said raised portion with the background of the said indicia relieved, a relieved portion between the said outer circumferential portion and the central hub member with the space therebetween relieved to the same extent as the background of the said indicia.

JOSEPH M. S. KAUFMAN.
SHELLEY KRASNOW.

REFERENCES CITED

The following references are of record in the file of this patent:

UNITED STATES PATENTS

| Number | Name | Date |
|---|---|---|
| 538,889 | Arvidson | May 7, 1895 |
| 626,791 | Miller | June 13, 1899 |
| 669,068 | Arthur | Mar. 5, 1901 |
| 699,450 | Christensen | May 6, 1902 |
| 849,841 | Goode | Apr. 9, 1907 |
| 961,862 | Huntington | June 21, 1910 |
| 978,093 | Weule | Dec. 6, 1910 |
| 1,640,166 | White | Aug. 23, 1927 |
| 1,820,791 | Forrest | Aug. 25, 1931 |
| 1,898,367 | Heinze | Feb. 21, 1933 |
| 2,206,003 | Donnell | June 25, 1940 |

FOREIGN PATENTS

| Number | Country | Date |
|---|---|---|
| 537,924 | Great Britain | 1941 |